US009233764B2

(12) United States Patent
Oliveira (10) Patent No.: US 9,233,764 B2
(45) Date of Patent: *Jan. 12, 2016

(54) IN-FLIGHT ENTERTAINMENT SEAT END SIMULATOR

(75) Inventor: Edouard Oliveira, Corona, CA (US)

(73) Assignee: Thales Avionics, Inc., Irvine, CA (US)

( * ) Notice: Subject to any disclaimer, the term of this patent is extended or adjusted under 35 U.S.C. 154(b) by 475 days.

This patent is subject to a terminal disclaimer.

(21) Appl. No.: 13/151,641

(22) Filed: Jun. 2, 2011

(65) Prior Publication Data

US 2012/0310585 A1     Dec. 6, 2012

(51) Int. Cl.
*B64F 5/00* (2006.01)
*B64D 11/00* (2006.01)
*H04L 29/08* (2006.01)

(52) U.S. Cl.
CPC ........... *B64F 5/0045* (2013.01); *B64D 11/0015* (2013.01); *H04L 67/12* (2013.01)

(58) Field of Classification Search
USPC ........................................................ 702/119
See application file for complete search history.

(56) References Cited

U.S. PATENT DOCUMENTS

| | | |
|---|---|---|
| 6,453,259 B1 | 9/2002 | Infiesto |
| 6,499,027 B1 | 12/2002 | Weinberger |
| 6,609,051 B2 | 8/2003 | Fiechter et al. |
| 6,728,612 B1 | 4/2004 | Carver et al. |
| 6,938,258 B1 | 8/2005 | Weinberger et al. |
| 7,171,345 B2 | 1/2007 | Mocek |
| 7,269,761 B2 | 9/2007 | Yi |

OTHER PUBLICATIONS

André Baresel, Daimler Chrysler, Using TTCN-3 in an Automotive Context André Baresel, 04.05.2004 RIC/SM, Research on Software Technology Methods and Tools, p. 1-12.*
http://www.merriam-webster.com/dictionary/replicating, p. 1, printed on Nov. 22, 2013.*
Emma Kelly Perth, Future visions: New in-flight entertainment systems for the Airbus A380 and Boeing 787 examined, 10:50 Sep. 8, 2006, 6 pages.*
IFE380 Airbus A380 In-flight Entertainment System (IFE) Simulation, 2013, 2 pages.*
Notification of Transmittal of the International Search Report and the Written Opinion of the International Searching Authority, PCT/US12/39565, May 25, 2012.

(Continued)

*Primary Examiner* — Tung S Lau
(74) *Attorney, Agent, or Firm* — Myers Bigel Sibley & Sajovec (57) ABSTRACT

A system and method are provided for testing a vehicle entertainment (IFE) system, comprising: functionally replicating each of a plurality of IFE components selected from the group consisting of an aircraft interface unit, a content server unit, a network distribution unit, and a seat unit with a corresponding simulator unit model that simulates functions of the respective IFE component; providing each simulator unit model on a simulator server having a processor, the simulator server connecting to an IFE network that also connects at least one of actual or simulated seat units to at least one of actual or simulated content servers; providing a test controller that controls each simulator unit model; transmitting scenario information containing operation instructions to the simulator unit model; and executing the scenario information by the simulator unit model to perform operations corresponding to the operation instructions that cause the simulator unit model to communicate over the IFE network.

21 Claims, 6 Drawing Sheets

(56) References Cited

OTHER PUBLICATIONS

Notification Concerning Transmittal of International Preliminary Report on Patentability, PCT/US2012/039565, Dec. 2, 2013.
Notification of Transmittal of the International Search Report and Written Opinion of the International Searching Authority, PCT/US12/39565, Aug. 10, 2012.
Notification of Transmittal of the International Search Report and Written Opinion of the International Searching Authority, PCT/US12/40213, Aug. 1, 2012.
Notification of Transmittal of International Preliminary Report on Patentability, PCT/US12/40213, Jun. 3, 2013.
Andre Baresel, "Using TTCN-3 in an Automotive Context," 04.05.2004 RIC/SM, Research on Software Technology Methods and Tools, Daimler Chrysler, p. 1-12.
G. Bhaskar Rao, Network Element Testing Using TTCN-3: Benefits and Comparison, A. Prinz, R. Reed and J. Reed (Eds): SDL 2005, LNCS 3530, pp. 265-280, 2005, Springer-Verlag Berlin Heidelberg 2005.

* cited by examiner

IN-FLIGHT ENTERTAINMENT SEAT END SIMULATOR

BACKGROUND

The invention relates to a new device and method of validating and testing In-Flight Entertainment (IFE) systems using only a small percentage of the IFE seat end units for the testing.

Figure 1:
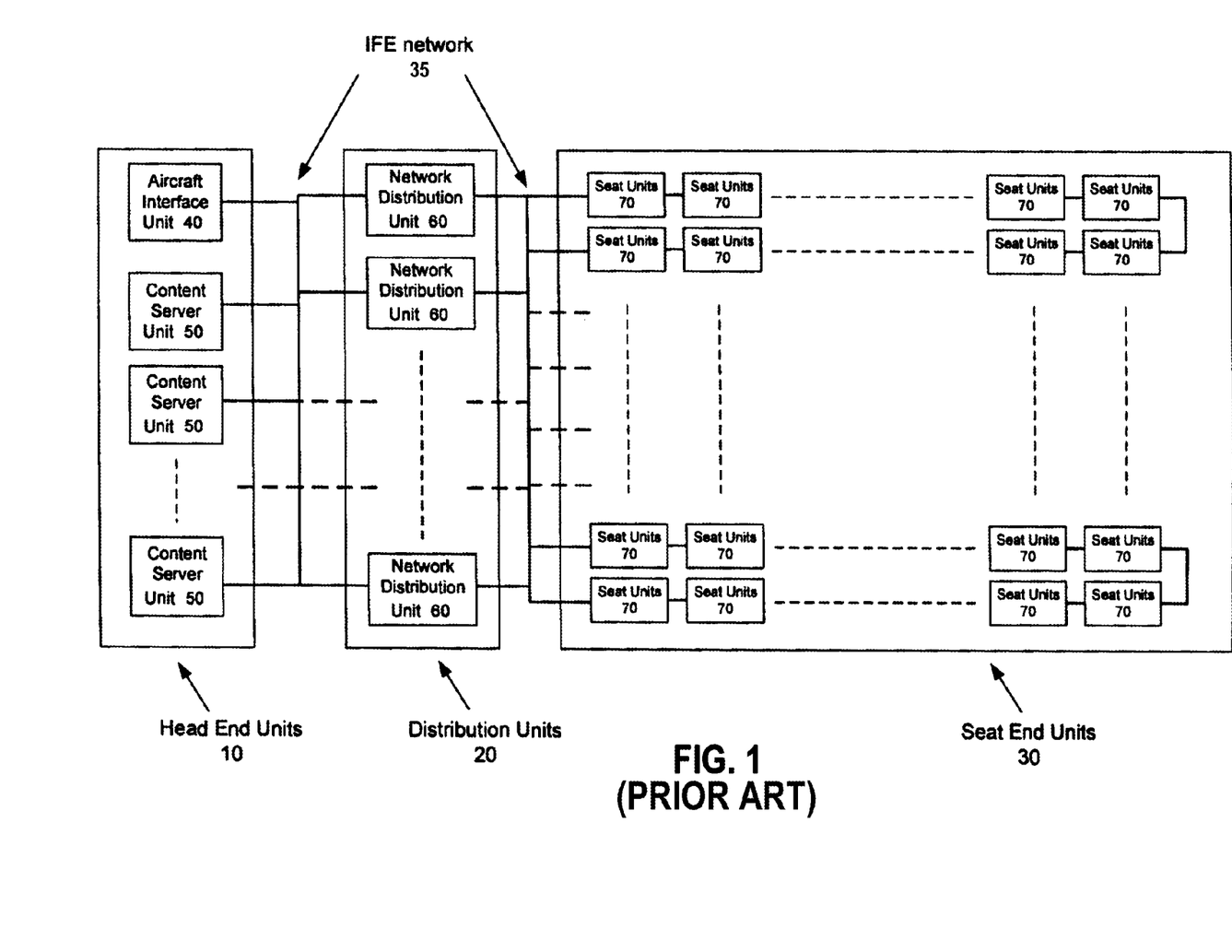
FIG. 1 is a block diagram of a known IFE system and test system illustrating various IFE system units.

FIG. 1 illustrates a known architecture for a modern IFE system that is generally composed of three different types of units: 1) head end units 10 encompassing content server units 50 (which hold media data, such as movie files, song files, and entertainment data, such as games, maps, etc., collectively referred to herein as "media content") and aircraft interface units 40 that receives information from the aircraft, such as position during a flight and deals with passenger announcements that typically interrupt the IFE during flight, as well as a stewardess call button or request to turn on a reading light; 2) distribution units 20, mainly composed of network distribution units 60, that are used to build the IFE network 35 topology and segregate the network traffic between the head end units 10 and seat end units 30; and 3) seat end units 30 that are generally composed of a passenger display unit 70 and a passenger control unit 70 per seat. Some of these units are comprised by "line replaceable units" (LRUs) which means that they are packaged in a housing in a predefined configuration that enables them to be rapidly installed and replaced in an aircraft.

The total number of units comprising an IFE System can reach several thousands for some wide body airplanes, where the head end units 10 represent approximately 1% of the total number of units, the distribution units 20 represent approximately 1% of the total number of units and the seat end units 30 represent approximately 98% of the total number of units.

The current testing methodology widely used in the IFE industry requires building labs that are representative of the final configuration in the airplane. As a consequence, all of the airplane units are usually assembled in a lab for testing purposes before the final installation in the airplane.

There are two primary disadvantages with the current IFE testing methodology: costs related to the airplane unit's mobilization in the labs during the testing phase, and the late (in the delivery cycle) availability of IFE units for testing purposes.

Costs related to the airplane unit's mobilization in the labs during the testing phase can be divided into three different categories: cash advance, unit rework costs, and facility resource usage. In order to set up a lab representative of the final airplane configuration, the IFE company usually has to build all of the IFE units of a ship set, often several months before the final delivery to the airline. This represents a substantial cash advance and labor intensive activity that can impact the IFE company's financial results.

During the testing phase in the lab, some of the units are inevitably damaged and then have to be reworked before installation in the airplane. This rework includes new parts and additional labor that can have an impact on the IFE company's financial results. Furthermore, during this phase, substantial facility resources like space, power, and cooling are required to operate the lab. In some circumstances, the delivery to an additional customer may require a building extension that can impact the IFE company's financial results.

Late availability of the IFE units is another disadvantage of the current IFE testing methodology. The system-level testing (or full scale testing) of the IFE components can only be performed when the lab is assembled and fully functional. This occurs usually at a late stage during the overall development process and often delays the discovery of major issues not identified during IFE component unit tests.

Although the cost of the present method of testing could be reduced by postponing the assembly of the lab, this is counterbalanced by the fact that the risk of late discovery of major issues could be reduced by an earlier assembly of the lab. Thus, the current methodology represent an antinomy, since minimizing the effect of one disadvantage will increase the effect of the other disadvantage. The costs related to the airplane unit's mobilization in the labs could be reduced by postponing the assembly of the lab, but having the IFE units available later in the testing phase would introduce additional risk at the final stage of the program. Having the IFE units available earlier during the testing phase would help reduce the risk of discovering major issues close to the customer delivery, but would introduce additional costs due to the unit's mobilization for an extended period of time.

SUMMARY

A system and method are provided for testing a vehicle entertainment (IFE) system, comprising: functionally replicating each of a plurality of IFE components selected from the group consisting of an aircraft interface unit, a content server unit, a network distribution unit, and a seat unit with a corresponding simulator unit model that simulates functions of the respective IFE component; providing each simulator unit model on a simulator server having a processor, the simulator server connecting to an IFE network that also connects at least one of actual or simulated seat units to at least one of actual or simulated content servers; providing a test controller that controls each simulator unit model; transmitting scenario information containing operation instructions to the simulator unit model; and executing the scenario information by the simulator unit model to perform operations corresponding to the operation instructions that cause the simulator unit model to communicate over the IFE network.

DESCRIPTION OF THE DRAWINGS

The invention is illustrated below by various exemplary embodiment illustrated in the drawings and described in more detail below.

DETAILED DESCRIPTION

Figure 2:
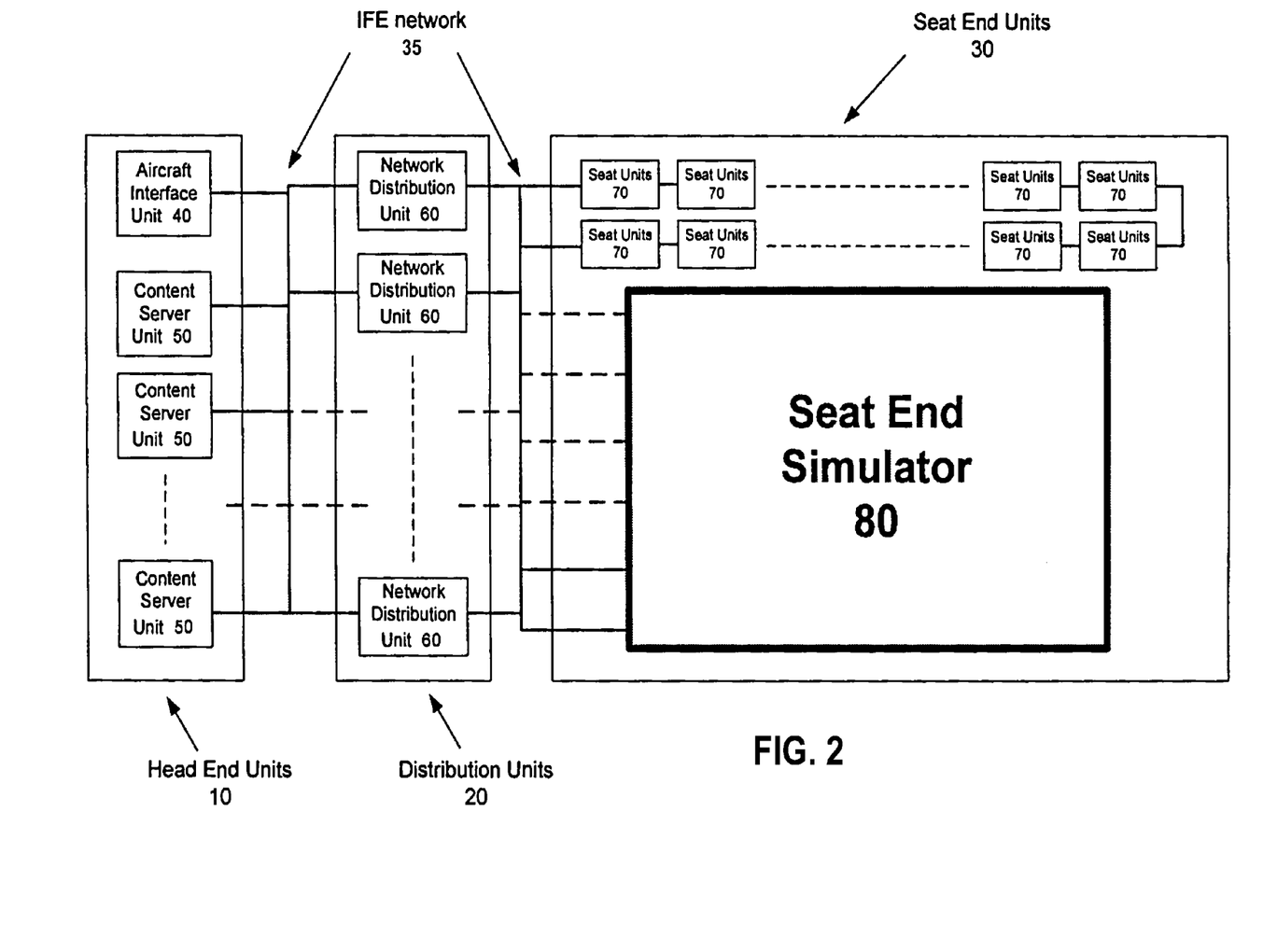
FIG. 2 is a block diagram of an exemplary embodiment of a test IFE system comprising a seat end simulator.

An embodiment of the invention is illustrated in FIG. 2, in which like elements can be found in FIG. 1. However, FIG. 2 illustrates the addition of a seat end simulator 80 that contains hardware and software that simulates functional aspects and replaces many or all of the seat end units 70 within a single contained housing or immediately adjacent housings for purposes of simulating the seat end units 70 (or other system units) and testing the IFE system. This provides the capability to test full-scale configurations without the need to use all of the seat end units 70 being in place and without requiring end users to interact with real-world hardware devices such as touch screens, personal control units, and the like. Access to the seat end simulator and associated testing can be provided via the system test user interface (UI) 85, which may provide for any traditional display/monitor hardware, keyboard, mouse, and other hardware typically found on a PC or workstation. Individual simulation models can be viewed by way of this test UI 85.

Using the approach described above, the seat end simulator 80 can be built as a portable unit containing all of the hardware (simulation servers, switches, cables, etc.) and software (simulation and model) needed. This design offers two main advantages: the ability to move and share the simulator 80 between test environments (e.g., labs containing IFE system units), and the reduced cost inherent in building fewer instances of the simulator 80.

It would also be possible to build separate instances of the simulator 80, one for each test environment. In that case, it would not be necessary to include the additional hardware to make the server instance portable, and some connectors might become redundant, slightly reducing the cost of each server instance. Overall, if many server instances are needed, sharing units might be less expensive. This is a trade-off that can be evaluated based on the number of test environments and the time the simulator 80 is needed in each environment.

The simulator 80 simulates IFE system seat end units 70 because these are the most numerous in such a system and represent the largest fraction of the cost of the system. It may also be possible to extend the invention to simulate other (possibly all) IFE system units, including the network distribution units 60, content server units 50, and aircraft interface units 40, in any number and in any combination. In this scenario, the invention could be used to exercise any such physical unit in isolation from other physical units but with its behavior as though the entire system were present. Just as with the seat unit end unit 70 simulators, it is preferable in this scenario to associate one instance of the simulator with an associated aircraft interface 40, content server 50, network distribution 60, or any other unit, of the vehicle. And simulating the entire system may have benefits during the design phase of a new system, before any physical units are constructed.

For definitional purposes, the seat end simulator 80 as used herein, can mean a simulator for seat end units 80, but can also mean a generic simulator that simulates aircraft interface units 40, content server units 50 and/or network distribution units 60. Thus, the seat end simulator 80 can be referred to as a generic simulator or a simulator.

Figure 3:
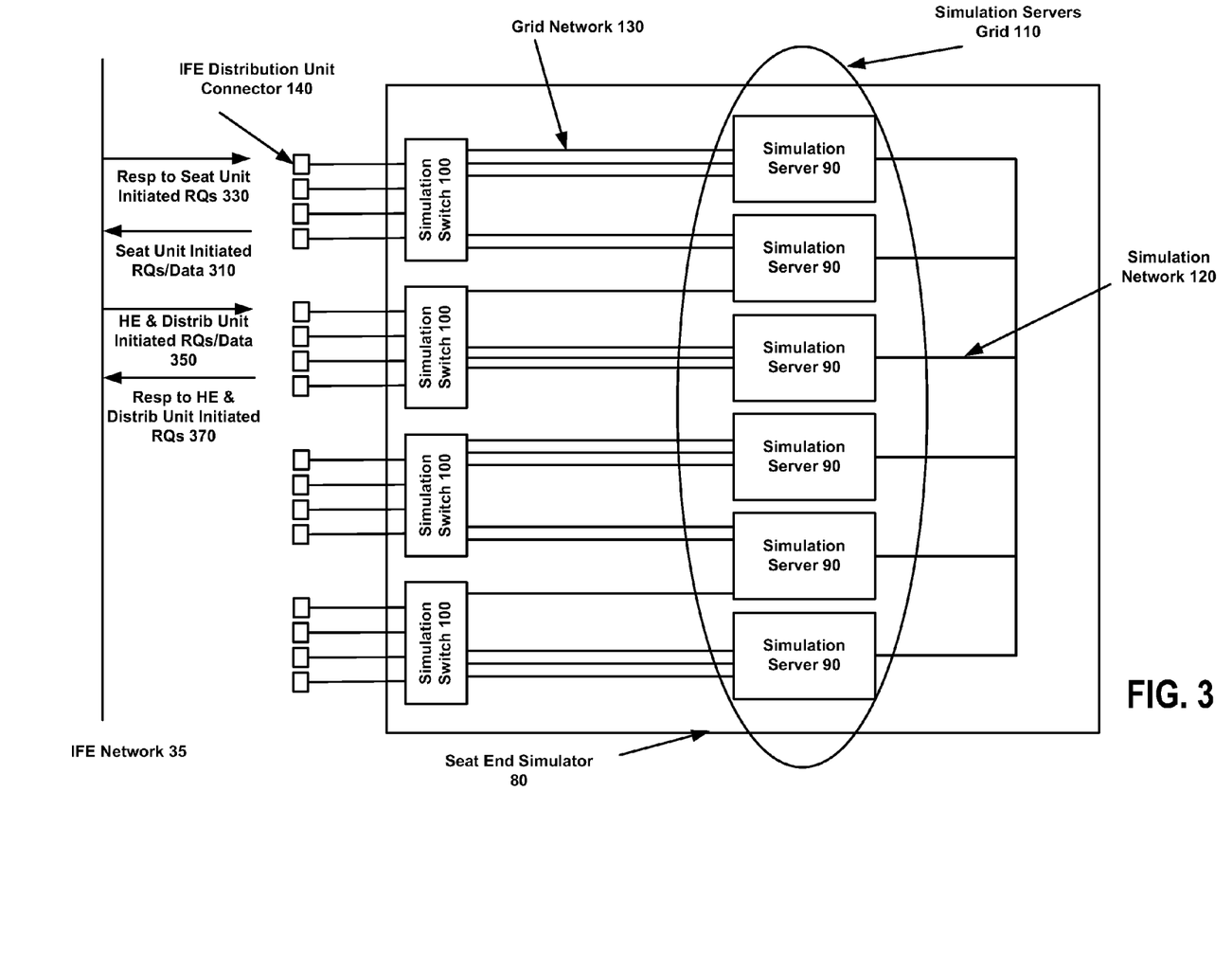
FIG. 3 is a block diagram illustrating a hardware architecture of a seat end simulator.
Figure 4:
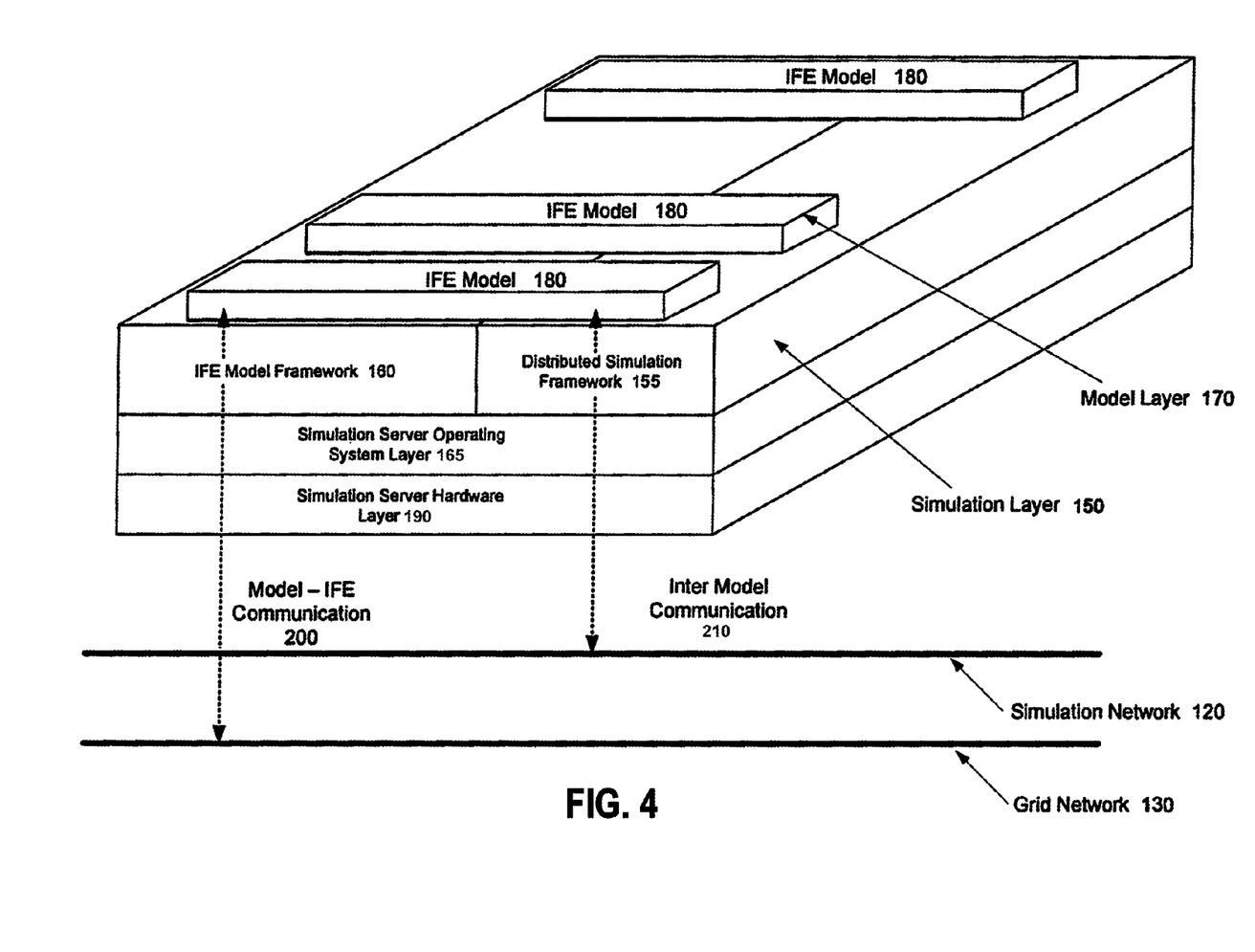
FIG. 4 is a block diagram/model illustrating a software architecture of a seat end simulator.

The hardware and software architecture of the seat end simulator 80 is illustrated in FIGS. 3 and 4.

Although it is possible that all simulation server instances can be run on a single computer, practical considerations suggest that the simulation server comprises a cluster of server computers. This architecture permits it to properly test out network connectivity and other aspects of the network architecture, such as in a real-world example where there are a number of connections coming from a network distribution unit 60. This architecture can permit the simulation server to easily accommodate this number of connections.

Referring to an exemplary configuration shown in FIG. 3, a grid 110 of simulation servers 90 hosting IFE unit models are provided, and these are interconnected through a simulation network 120. A grid network 130 topology is defined to reproduce the network configuration of the IFE system under simulation and interfaces directly with IFE distribution unit connectors 140 though simulation switches 100, which are standard network switches that are a part of the simulator and that merge traffic between several connections from the distribution units to one or more network interfaces of the simulation server. The IFE distribution unit connectors 140 are preferably identical to those that the actual seat units 70 would use to connect to an IFE distribution unit.

The IFE distribution unit connector 140 serves as an interface between the IFE network 35 and the grid network 130 connected to the simulation servers 90 of the seat end simulator 80. The messages/communications 310, 330, 350, 370 that would normally flow to and from the actual seat units 70 occur at the connectors 140. These messages/communications include seat unit initiated requests and seat unit originated data 310, responses to seat unit initiated requests 330, head end unit and distribution unit initiated requests and originated data 350, and responses to the head end unit and distribution init requests 370.

An exemplary software architecture of the seat end simulator 80 is illustrated in FIG. 4. According to FIG. 4, a set of independent models 180 are provided for simulating the functional and technical behavior of the IFE seat end units 70. In a preferred embodiment, each model instance 180 corresponds with one seat. These models 180 present an interface to the IFE system capable of reproducing the communication exchanges 200 that would normally occur between the seat end units 70 and head end units 10 via the grid network 130 through the IFE Model Framework 160, and an interface to a distributed simulation framework 150 responsible for the inter-model communication and data exchanges 210 between the simulation servers 90 via the simulation network 120.

Each simulation server 90 will have one or more seats/IFE models 180 allocated to it. In a preferred embodiment, there are fifty to one hundred simulated seat models 180 per server 90, but this ratio can be dictated by hardware configuration and capabilities. A preferred embodiment to accommodate the above-indicated number of models 180 per server 90 could be a blade server that uses, e.g., sixteen cores.

Preferably, the behavior of each IFE seat model instance 180 is identical across the seats, i.e., one instance of the model 180 for each seat is created/simulated for each seat being simulated, so the behavior of the model 180 will be the same for all of the seats. The primary variable in the testing, is how each particular model 180 is being stressed. With the test controller 87, a different scenario can be tested for each seat/model 180, and the test scenario permits having different stresses on the models 180 that can vary depending on the simulation and the seat considered.

There are some parameters of the model 180 that are driven by the location of the seat in the system. For example, in the network, each seat (and simulated seat/model 180) has an Internet Protocol (IP) address, and thus each model 180 will have a parameter that is the IP address of the seat being simulated, and for each instance of the model 180, a different value for this parameter is provided. Each model 180 can also have parameters, such as a seat identifier, version numbers of software or hardware (for example, older versions of software or hardware can be simulated by the model 180, e.g., by running slower), information about a link to content, such as a link to a movie name, etc. There can also be parameters that describe the behavior of a model in addition to those that define a configuration of the model. For example, if simulation of a random behavior is desired (for response time), then on parameter p1 could be the average delay, and p2 could be a magnitude of the variance of the delay.

The model 180 therefore replicates/simulates the generic behavior of the functionality on one seat, along with the specialized behavior with the parameters of the models 180 that have been defined. Importantly, the parameters also dictate the manner in which the system is stressed. Thus, these parameters could delineate between a first class seat, a business class seat, and an economy class seat, since different services and information may be offered depending on the class. For example, in first class, MPEG-4 encoded videos might be available, whereas in economy class, only MPEG-1 encoded videos are made available. The models 180 and associated parameters take this into account, and result in different stresses on the content servers 50 and aircraft interface 40.

By simulating a portion of the actual seat end units 70 with the simulation servers 90 and IFE models 180, the number of seat end (or other) units needed for testing can reduced by approximately 75% or even more (100% under various test scenarios), and thus the two main disadvantages of the current IFE system testing methodology are substantially reduced. A global test can be used to drive both the real units in the system and the simulated units, and the test.

While the primary advantage of this simulator is to reduce the number of seat end units 70 needed to test and validate the IFE system, an additional side benefit of this system is to allow model based prototyping during or before the design and/or development phases of the IFE system, providing the capability to validate new concepts or functionalities on a full-scale configuration without the need for actual seat end units 70.

The simulation servers 90 that comprise the simulation server grid 110 are interconnected through a dedicated network designated as a simulation network 120. The simulation network 120 allows the different models 90, 180 of the simulation to communicate with each other. Each simulation server 90 offers a set of network interfaces connected to the IFE distribution units through several simulation switches 100. The number of interfaces used by each simulation server depends on the IFE system configuration under simulation.

The simulation servers 90 and the simulation switches 100 can be installed in a standalone and mobile simulation rack that embodies the seat end simulator 80. The simulation rack preferably has a configurable back panel to adapt the simulation server layout based on the IFE system configuration under simulation. The simulation rack back panel also provides the connectors 140 to interface with the IFE distribution units.

Referring to FIG. 4, the seat end simulator software architecture may comprise two distinct layers providing the services required for the IFE simulation. Those two layers (simulation layer 150 and model layer 170) sit on top of the simulation server hardware layer 190 and the operating system layer 165. In a preferred embodiment, the Linux/Unix operating system may be used, but any common operating system can be utilized.

The simulation layer 150 is comprised of the IFE model framework 160 and the distributed simulation framework 155. The IFE model framework 160 provides the services needed to operate the models 180 of a simulation. Some of these services are hardware resources abstraction, model instances management, model events management, intra-model communication, etc. The distributed simulation framework 155, which is based on a data-centric framework, provides the services needed to allow the deployment of a simulation on the simulation server grid 110 and the communication between models across the simulation grid. The model layer 170 encompasses all of the models 180 used for one simulation. A set of different models can be used in conjunction to simulate a particular behavior on each seat of the IFE system, or to provide the required levels of simulation granularity for a particular seat.

IFE model framework 160 is the framework on which the different functionalities for the different seats is built. The IFE model framework 160 is the backbone of the simulation and provides services that an IFE model 180 can use to be executed. One exemplary service involves intra-model communications, i.e., elements that provide for communication within a model; another involves the scheduling of execution of the models 180; another provides for synchronization between model elements. This framework 160 is the executive of all of the models 180, and it creates all of the instances of the models 180—it provides the mechanisms that make the models 180 work. The approach used provides guidelines and functional capabilities for developers so that they can develop software in an easy and consistent way and includes mechanisms so that the models can work.

The distribution simulation framework 155 provides the routines to ensure that inter-model communication is possible. It can be within the same simulation server 90 and it can also be between simulation servers 90, since it is possible to have one simulated seat 180 in the simulation server 90 that might need to communicate with a seat 180 in a different simulation server 90—this provides services so that the different models 180 can communicate with one another.

The simulation network 120 and inter-model communication 210 comprise a technical link between the models 180 and the framework 155, 160 for the models 180. For some functionalities it is necessary to be able to communicate between seats, such as in a chat application or a multiplayer games application. The simulation permits generating communication between two seats or several seats that replicates such communications as would normally occur between actual seats 70.

Some of the communications need to go through the network distribution units 60 to accurately simulate the load. But for certain parts of the simulation, the communications are directly seat-to-seat, i.e., these communications do not go over the distribution units 20. Thus, this model 180 replicates the technical behavior of the actual seat units 70. Furthermore, some LRUs communicate with each other at the seat level; for example, the LRUs may need to communicate with each other in order to set up a network topology. These are not communications initiated by or visible to a passenger, but in order for the IFE to work, such types of communications can be important. In this case, when a plurality of adjacent seat boxes are being simulated, in order for them to interact with each other, such inter-seat communications can occur via inter-model 180 communications over the simulation network 120—these communications do not take place over the grid network 130, as would communications going through the distribution units 20, 60.

Figure 5:
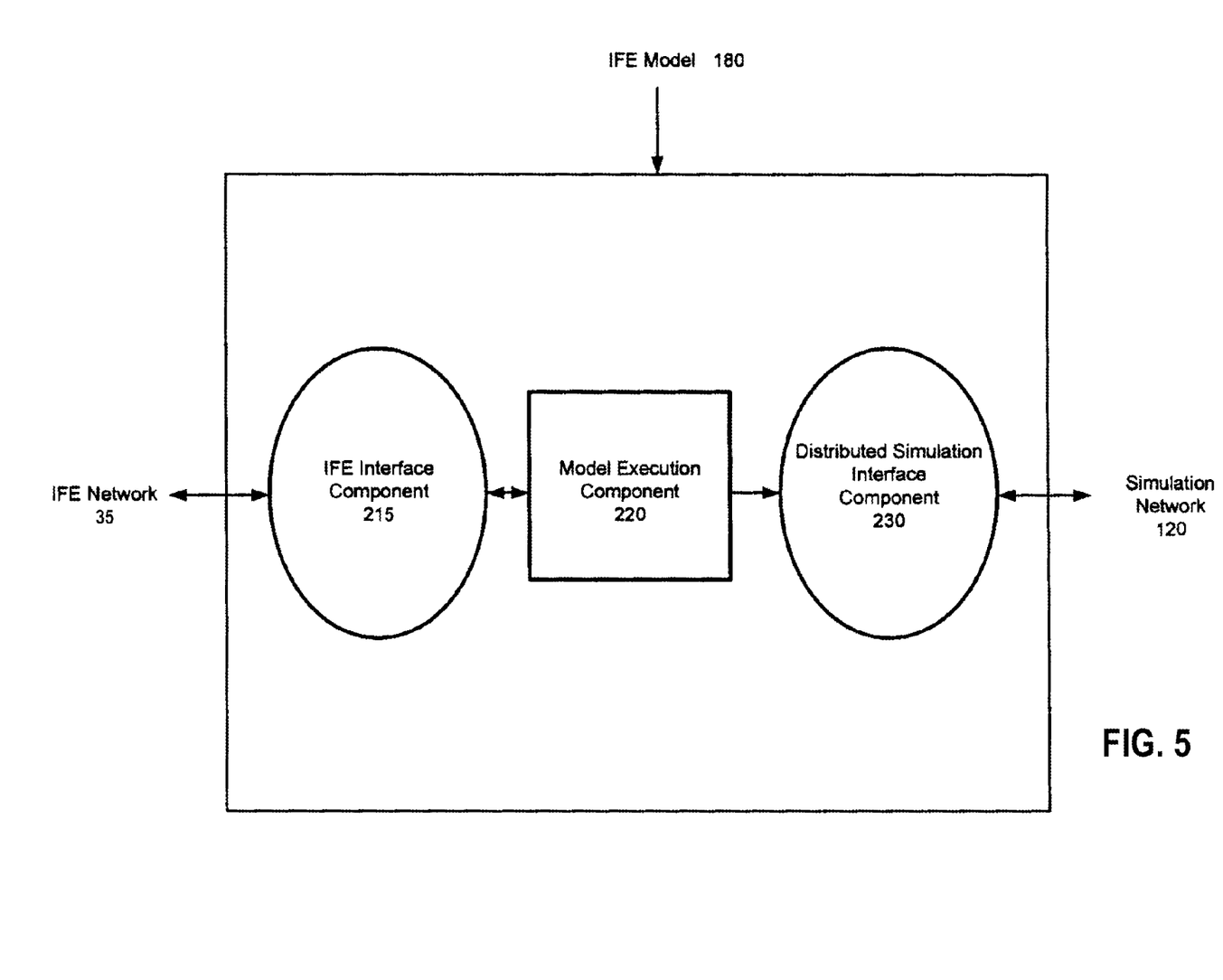
FIG. 5 is a block diagram illustrating an IFE model.

As illustrated in FIG. 5, each IFE model 180 comprises three main components: an IFE interface component 215 responsible for the interaction with the IFE system through the IFE grid network 130; a model execution component 220 responsible for simulating the seat end unit behavior; and a distributed simulation interface component 230 responsible for the interaction with the other models of the simulation through the simulation server network 120.

Using the test UI 85, a tester can select a particular seat (IFE model 180) that is being simulated by seat end simulator 80 and perform actions and review activities on this particular seat. This permits the tester to perform various actions that he could perform on an actual seat unit 70 from the test UI 85.

Furthermore, a test controller 87 or a test counsel is provided that is operated in conjunction with the test UI 85, and may actually be run on the same physical hardware. The test controller 87 is responsible for running the tests to test out the overall system, and can be used to manually or programmatically control each of the IFE models 180 within the seat end simulator 80. The test UI 85 and test controller 87 permit remote interaction with the system and active simulation.

By way of example, if a tester wishes to test the results of starting a two-hour movie from (simulated) seat 5A, the tester can open the test UI 85 and select seat 5A, which brings up a screen permitting the tester to select and begin playing a particular movie from that specific simulated seat. From this display, the tester can pause, terminate, rewind, play, fast forward, or take any other action that a normal user might take from a normal seat unit 70. The tester can also select groups of seats, e.g., 5A-15J, in order to perform a common set of operations. Thus, through the test graphical user interface 85, a way is provided to interact with the simulated seat 180.

Figure 6:
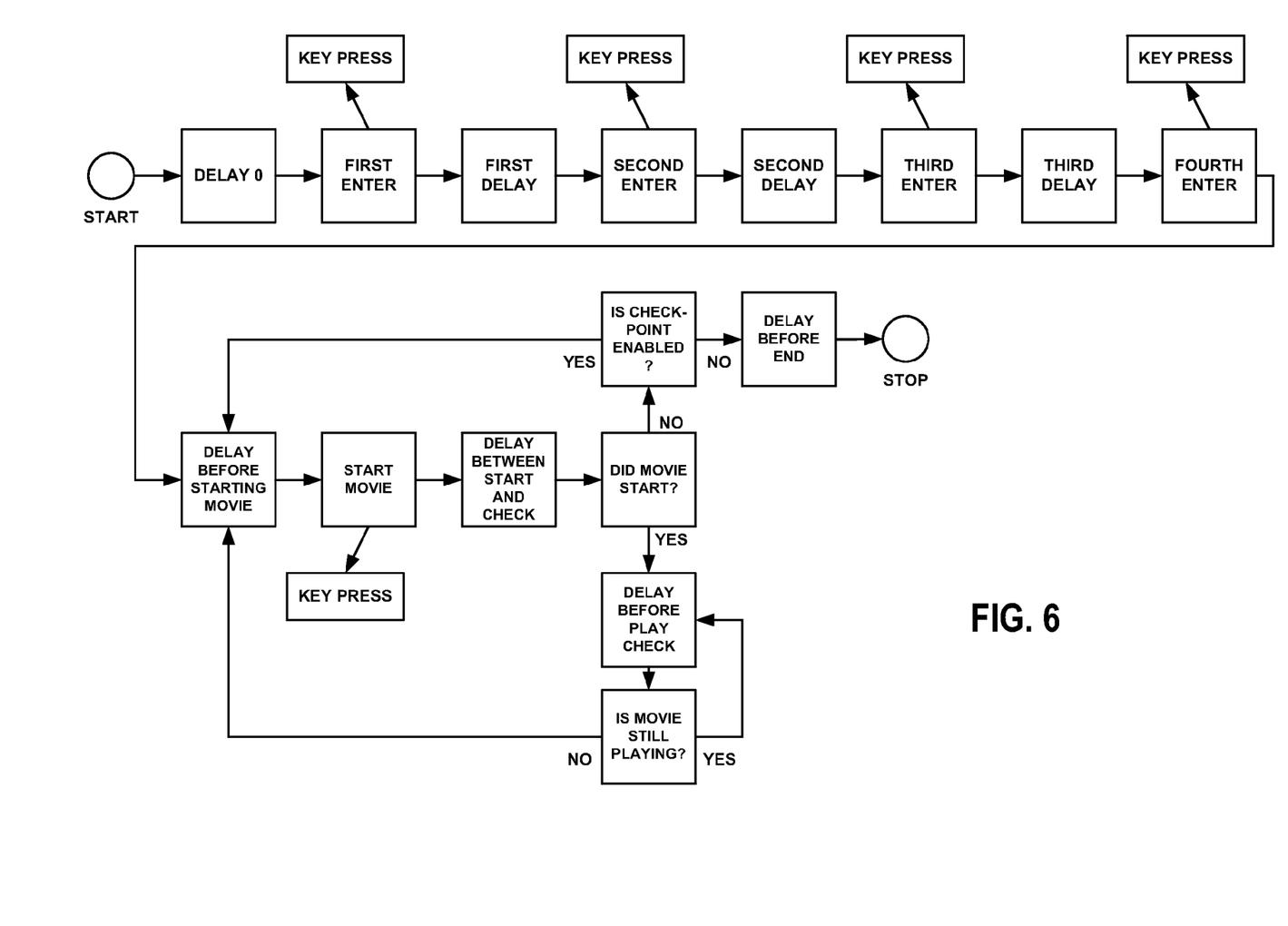
FIG. 6 is a pictorial illustration of a graphical flow model.

The tests may be constructed using a graphical flow model on the test UI 85 of the test controller 87, or on an off-line system. FIG. 6 illustrates an exemplary display of such a graphical flow model. Various blocks representing activities that are to take place in a test can be dragged around on a display and positioned in sequential order, and connectors can be provided for sequencing. Conditional statements, branching, and any flowchart-type control structure can be provided as well. This graphical flow model dictates what the model is doing and how the different elements of the model are interacting with each other, thus permitting a definition of the scenarios. Alternately, it may be possible to define the scenarios in terms of a list of events in, e.g., a text file or XML file, as described in the application cited in the cross-references section. In this way, the scenarios are built for each seat, and collectively, these define a global test for the system.

The graphical flow method of describing the scenarios is much more visual, and permits a tester to easily visualize what each seat is doing. The text file that is merely a list of events is much less visual. By way of example, if the tester wants to go from the main page or the welcome page to the movie selection page, the key pieces of what to do are defined, instead of describing merely the keypresses that are performed. Thus, a command is provided that simply says "go from the main page to the movie selection page".

These commands, and associated graphic, could include, e.g., a "start movie", "pause movie", "rewind movie", and other functions for dealing with movies—similar commands could be provided for dealing with audio content. A passenger services program model might include a flight attendant call, or a reading light function (e.g., "turn on the reading light", "turn off the reading light", "activate the flight attendant call", and deactivate the flight attendant call"). For a games program model, the functions may include "select the game", "start the game", "load the game", and "stop the game".

There is also a model that deals with the network configuration (a "network configuration model"), so a part of the model can test that the network is okay. For example, if a particular LRU is lost on the system, there should be redundancy so that the system can reconfigure itself to change the path to the server. The network configuration model permits, for example, simulating an LRU failure. This may be achieved by, e.g., a commands, "break the link between LRU A and LRU B".

Thus, the possible commands can be very functional, and be able to perform any function on the seat end simulator IFE model 180 that a passenger can do on a normal seat unit 70, and the commands can also be technical, e.g., disconnecting cables and associated detection, or going from a nominal state to a degraded state, e.g., where the cables are inverted.

Each of the IFE models 180 are thus provided with a particular scenario file or series of instructions/commands to run in order to simulate various aspects of an actual seat unit 70. Additionally, or alternately, tests can be run to randomly emulate requests or responses that might be present with an actual seat unit 70. The scenarios could be downloaded to the IFE models 180 by, e.g., the test controller 87, or the scenarios could be pulled by the IFE model 180 itself from some centralized storage.

Although the system and method have been described in terms of an in-flight entertainment system simulator, the invention is not restricted to aircraft and could be utilized in any form of vehicle or enterprise that provides an entertainment system accessible by passengers or customers, and use of in-flight should be construed broadly and is defined herein as meaning "in-use" by a passenger or customer.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

TABLE OF REFERENCE CHARACTERS

| | |
|---|---|
| 10 | head end units |
| 20 | distribution units |
| 30 | seat end units |
| 35 | in-flight entertainment (IFE) network |
| 40 | aircraft interface unit |
| 50 | content server unit |
| 60 | network distribution unit |
| 70 | seat unit |
| 80 | seat end simulator |
| 85 | system test user interface (UI) |
| 87 | test controller |
| 90 | simulation server |
| 110 | simulation servers grid |
| 120 | simulation network |
| 130 | grid network |
| 140 | IFE distribution unit connector |
| 150 | simulation layer |
| 155 | distributed simulation framework |
| 160 | IFE model framework |
| 165 | simulation server operating system layer |
| 170 | model layer |
| 180 | IFE model |
| 190 | simulation server hardware layer |
| 200 | model - IFE communication |
| 210 | inter-IFE model communication |
| 220 | model execution component |

-continued

TABLE OF REFERENCE CHARACTERS

| | |
|---|---|
| 230 | distributed simulation interface component |
| 310 | seat unit initiated requests and data |
| 330 | response to seat unit initiated requests |
| 350 | head end and distribution unit initiated requests and data |
| 370 | response to head end and distribution unit initiated requests |

What is claimed is:

1. A method for testing a vehicle entertainment (IFE) system, comprising:

functionally replicating each of a plurality of IFE components selected from the group consisting of an aircraft interface unit, a content server unit, a network distribution unit, and a seat unit to provide a corresponding aircraft interface unit simulator model, content server unit simulator unit model, network distribution unit simulator model and seat unit simulator model, respectively, each simulator unit model simulating a corresponding function of the respective IFE component;

replacing at least one of the plurality of IFE components with a corresponding one of the simulator unit models on a simulator server having a processor, the simulator server connecting to an IFE network that also connects at least one of actual or simulated seat units to at least one of actual or simulated content servers;

providing a test controller that controls each simulator unit model;

transmitting scenario information containing operation instructions to the simulator unit model; and executing the scenario information by the simulator unit model to perform operations corresponding to the operation instructions that cause the simulator unit model to communicate over the IFE network.

2. The method according to claim 1, further comprising: interacting with the simulator unit models using the test controller as it is executing the scenario information.

3. The method according to claim 1, wherein the scenario information includes commands selected from the group consisting of: a) audio or video file control commands; b) passenger service commands; and c) game commands.

4. The method according to claim 3, wherein:

the audio or video file control commands are selected from the group consisting of: select media, start media, pause media, stop media, rewind media, and fast-forward media.

5. The method according to claim 3, wherein:

the passenger service commands are selected from the group consisting of: turn on a reading light, turn off the reading light, activate a flight attendant call, and deactivate the flight attendant call.

6. The method according to claim 3, wherein:

the game commands are selected from the group consisting of: select a game, load the game, start the game, and stop the game.

7. The method according to claim 1, further comprising: executing the scenario information by a model execution component of the simulator unit model; and communicating to the IFE network via an IFE interface component.

8. The method according to claim 1, wherein the simulator unit model is a seat simulator model that simulates a seat unit.

9. The method according to claim 8, further comprising:
communicating by the seat simulator model with other simulated seats at least partially over a simulation network that is separate from the IFE network.

10. The method according to claim 9, further comprising: communicating to the local network via a distributed simulation interface component.

11. The method according to claim 8, further comprising:
sending a request or data from the seat simulator model to a content server; and
receiving a responsive response or data from the content server by the seat simulator model.

12. The method according to claim 8, further comprising:
sending a request or data from the content server to the seat simulator model; and
receiving a responsive response or data from the simulator model by the content server.

13. The method according to claim 1, further comprising:
including actual physical components in the testing.

14. The method according to claim 13, wherein approximately 25% of the components are actual physical components.

15. The method according to claim 1, further comprising:
connecting the simulator server to the IFE network through a simulation switch.

16. The method according to claim 1, further comprising:
providing connectors that connect the simulation server to the IFE network that are identical to connectors that connect actual physical IFE components to the IFE network.

17. The method according to claim 1, further comprising:
creating the scenario information by arranging and functionally associating graphical functional blocks representing simulation functions on a graphical user interface.

18. The method according to claim 1, further comprising:
providing a shared simulation framework that comprises a common set of program calls that are callable by each simulator unit model.

19. The method according to claim 18, further comprising:
transmitting and receiving communications through a simulation server hardware layer, a simulation server operating system layer, and the simulation framework.

20. The method according to claim 1, further comprising:
executing the scenario information by the simulator unit model to perform operations corresponding to the operation instructions that cause the simulator unit model to communicate over a simulation network.

21. A system for testing a vehicle entertainment (IFE) system, comprising:
a simulator unit model that replicates functionality of a an IFE component selected from the group consisting of an aircraft interface unit, a content server unit, a network distribution unit, and a seat unit to provide a corresponding aircraft interface unit simulator model, content server unit simulator unit model, network distribution unit simulator model and seat unit simulator model, respectively;
each simulator unit models simulating corresponding functions of the respective IFE component, wherein at least one of the IFE components are replaced with a corresponding one of the simulator unit models;
a simulation server that executes the simulator unit model, the simulator server connecting to an IFE network that also connects at least one of actual or simulated seat units to at least one of actual or simulated content servers;
a test controller that controls each simulator unit model;
scenario information containing operation instructions that is transmitted to the simulator unit model, the scenario information being executed by the simulator unit model to perform operations corresponding to the operation instructions that cause the simulator unit model to communicate over the IFE network.

* * * * *